(12) United States Patent
Rusek

(10) Patent No.: US 6,991,772 B1
(45) Date of Patent: Jan. 31, 2006

(54) $H_2O_2$ DECOMPOSITION CATALYST

(75) Inventor: John J Rusek, West Point, IN (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 0 days.

(21) Appl. No.: 10/608,755

(22) Filed: Jun. 30, 2003

Related U.S. Application Data

(60) Continuation-in-part of application No. 09/761,064, filed on Jan. 17, 2001, now abandoned, which is a continuation-in-part of application No. 09/255,531, filed on Feb. 22, 1999, now abandoned, which is a division of application No. 08/454,895, filed on May 31, 1995, now abandoned.

(51) Int. Cl.
*C01B 5/00* (2006.01)
(52) U.S. Cl. .................. 423/580.1; 423/579
(58) Field of Classification Search .......... 423/580.1, 423/579
See application file for complete search history.

(56) References Cited

U.S. PATENT DOCUMENTS 3,884,836 A * 5/1975 Kuhl et al. .................. 502/241
3,887,696 A * 6/1975 Bernard et al. ............. 423/579
4,752,461 A * 6/1988 Coeckelberghs et al. ... 423/579
4,861,560 A * 8/1989 Nakajima ................... 422/111

FOREIGN PATENT DOCUMENTS

JP 3-218904 * 9/1991

\* cited by examiner

*Primary Examiner*—Christina Johnson
(74) *Attorney, Agent, or Firm*—Thomas C. Stover

(57) ABSTRACT

An activated catalyst for the rapid decomposition of $H_2O_2$ is provided wherein a porous high surface area catalyst base, e.g. a zeolite molecular sieve (ZMS) is impregnated or doped with a solution of metal cation salts and an ionic promoter, dried and calcined to form an activated catalyst. Such activated catalyst, in the form of a porous monolith or chunks, extrudate, pieces, pellets, or spheres, can be poured into and confined, in a tight pack, in a cavity of a rocket housing, downstream of a pressurized $H_2O_2$ tank. The $H_2O_2$ is flowed through the catalyst and undergoes rapid decomposition into steam and $O_2$ and flows out the propellant nozzle of such rocket. Advantages of such activated catalyst are that it can be employed to rapidly decompose $H_2O_2$ to propel a) a mono-propellant rocket, b) a bipropellant rocket (having fuel and a combustion chamber) and c) a hybrid rocket (powered by $H_2O_2$ and fuel grain) and can also be used for a starter cartridge decomposition catalyst, a gas generator decomposition catalyst and the like. Another benefit of the activated catalyst of the invention is its low weight which is highly suitable in small flightweight rocket systems.

20 Claims, 5 Drawing Sheets

$H_2O_2$ DECOMPOSITION CATALYST

RELATED APPLICATIONS

This Application is a CIP of patent application Ser. No. 09/761,064, filed 17 Jan. 2001, abandoned, itself a CIP of patent application Ser. No. 09/255,531, filed 22 Feb. 1999, abandoned, in turn a Divisional of Ser. No. 08/454,895, filed 31 May 1995, abandoned, of the same title and inventorship.

STATEMENT OF GOVERNMENT INTEREST

The invention described herein may be manufactured and used by or for the Government for governmental purposes without the payment of any royalty thereon.

FIELD OF THE INVENTION

This invention relates to an activated catalyst for $H_2O_2$ decomposition, particularly a catalyst of high porosity and method for preparing same.

BACKGROUND OF THE INVENTION

Conventionally, catalysts have been employed for the decomposition of hydrogen peroxide as applied to monopropelant thrusters, liquid rocket engines, hybrid rocket systems and the like. The products of decomposition of $H_2O_2$ are steam and oxygen, which can then react with a conventional rocket fuel or a grain, in the case of a hybrid propulsion system.

In the prior art such catalysts have been in the form of catalyst packs made of layers of silver plated screens which have been activated with nitric acid or samarium salts. The major limitations are; 1) activity, where the surface area is low, thus more screens are needed which increases pressure drop; 2) poisoning, where any inhibitors present in the $H_2O_2$ plate out on the silver screens, thereby reducing surface area and hence, activity and 3) cost, not only of materials but complex fabrication costs.

Examples of catalyst pack screens are found in the prior art, e.g. in U.S. Pat. No. 5,077,257 (1991), U.S. Pat. No. 4,927,798 (1990) and U.S. Pat. No. 4,292,208 (1981), all to Baldi or Baldi et al. No improvement over the above catalyst screen packs has been noted in the prior art and there is need and market for a catalyst which is of low cost and low pressure drop and otherwise overcomes the above prior art shortcomings.

There has now been discovered an activated catalyst for $H_2O_2$ decomposition, which is of low cost, low weight and of low pressure drop, for, eg. mounting in a rocket propulsion system.

SUMMARY OF THE INVENTION

Broadly, the present invention provides an activated catalyst for the decomposition of $H_2O_2$ comprising, a) a porous catalyst base of either;
   1) zeolite molecular sieves (ZMS),
   2) porous alumina, silica or aluminosilicate, or
   3) high surface area ceramic materials all in the form of a porous monolith, a honeycomb or chunks, extrudate, pieces, pellets, spheres, (herein, "particles") or a combination thereof which are closely packed and b) a catalytic agent, the agent being at least one cation that has a defined valence state and has been doped on the base and calcined, the cation species being either Mn, Ag, Ru, Pb, V, Cr or Co or other transition metals or noble metals, such as Cu or Pt.

The invention also provides method for preparation of an activated catalyst for the decomposition of $H_2O_2$ comprising, a) selecting a high surface area, porous ceramic catalyst base in the form of a monolith, honeycomb or chunks, extrudate, pieces, pellets, spheres, (herein, "particles") or a combination thereof which are closely packed, b) mixing a soluble salt of a desired catalyst cation into a solvent therefor, the cation species being either Mn, Ag, Ru, Pb, V, Cr or Co or other transition metals or noble metals, such as Cu or Pt.

c) pouring the mixture of the soluble salt and solvent over the catalyst base in an amount sufficient to soak the catalyst base and dope it through the pores thereof with the cations, d) drying the so doped catalyst base so as to remove solvent therefrom and e) calcining the so doped catalyst base so as to form the activated bulk catalyst.

The so formed activated catalyst is then packed into, e.g. the housing of a rocket-propelled craft as further discussed below.

Thus the catalyst can be in the form of a porous monolithic base or in the form of porous particles closely packed in a container, which has, at least, partly open ends, such as ends covered by inlet and outlet screens. The particles are thus packed closely together to act as a monolith.

That is, the essential catalyst base or bed can be thought of as a monolith. This can include a monolithic catalyst within the bed or defined catalyst particles closely packed to act as a monolithic bed. It is important that whichever the monolithic bed, the components be arranged as to not move about, e.g., in the high flow fields of a rocket, thereby attriting.

By "calcining" as used herein, is meant, heating the doped catalyst base in an oxidizing or reducing atmosphere, e.g., in air, $H_2$ or $N_2$, without burning same, to form the activated catalyst of the invention. Thus Mn is suitably calcined in air, at, e.g. 450° C.

The doped catalyst base is calcined, e.g. in air, to form metal oxides of the catalysts doped thereon, to cause $H_2O_2$ to more readily decompose by lowering its activation energy,

BRIEF DESCRIPTION OF THE DRAWINGS

The invention will become more apparent from the following detailed specification and drawings in which.

DESCRIPTION OF PREFERRED EMBODIMENTS

Figure 1:
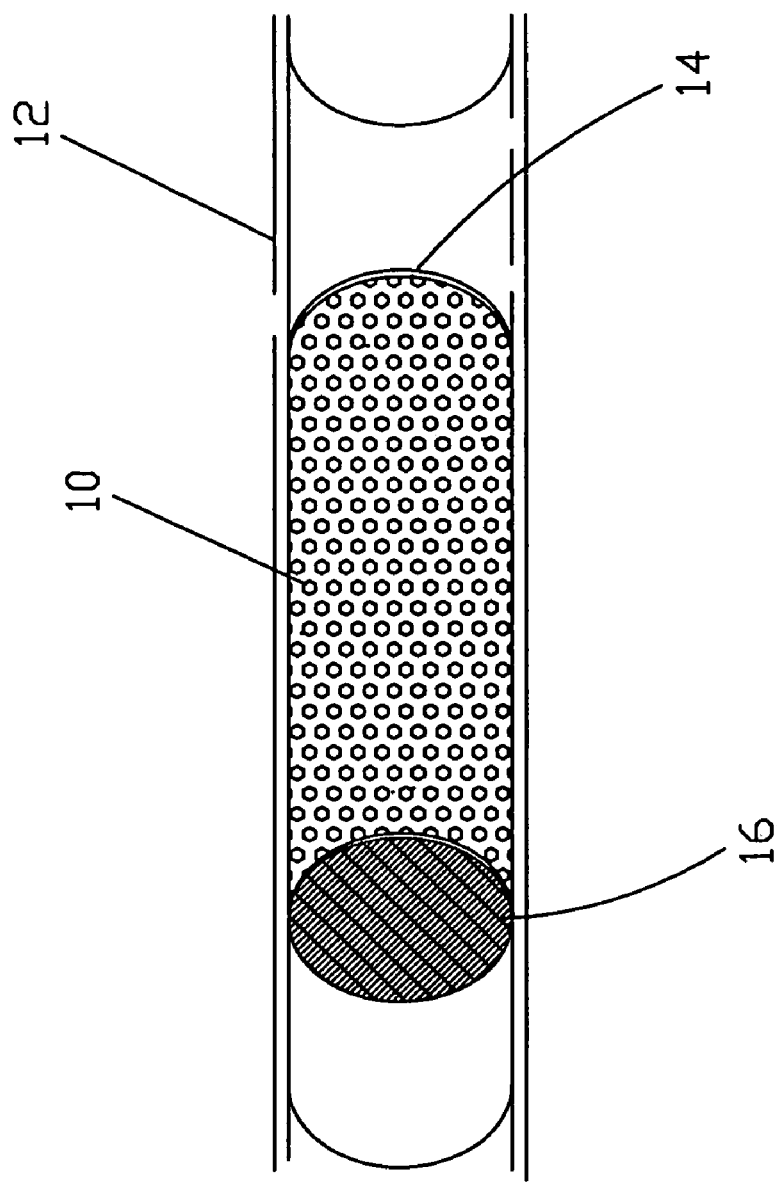
FIG. 1 is a partial perspective schematic view of a catalyst pack 10 embodying the present invention.

Referring in more detail to the drawings, FIG. 1 shows a catalyst pack 10 embodying the invention in a rocket housing 12 and held closely in place between two end screens 14 and 16 in such housing.

The catalyst pack embodying the invention is made according to the following process per the invention:

1) A high surface area, ceramic catalyst base, e.g. in pellets or spheres, commercially available, is obtained. Suitable materials are alumino-silicates, alumina, silica, activated carbon or other ceramic refractory oxides.
2) A catalyst cation loading is calculated based on a defined mole percentage of the final cationic species. As an example, a typical loading can be 1% w/w of manganese (+4) on a zeolite molecular sieve (ZMS).
3) A soluble salt of the desired cation is placed into a defined quantity of solvent; this is poured over the catalyst base in an amount sufficient to totally wet the catalyst base in bulk.
4) After a suitable equilibration time, (e.g. 10–60 mins or more) the solution/base system is dried in a vacuum oven to remove the solvent.
5) The formed catalyst is then activated by calcination in either a reducing (e.g. of Ag. in an atmosphere of $H_2$) or oxidizing (e.g. of Mn in air) atmosphere at a defined temperature and time range, e.g. 150 to 950° C. for 1/2 to 24 hrs.
6) Also if ionic (or catalytic) promoters are desired to boost the catalyst activity, steps 2) through 5) are employed as required.

The activated catalyst, e.g., as dried granules, is loaded by pouring into a cavity between an $H_2O_2$ pressurized storage tank and a combustion chamber. Typically, the catalyst is contained in, e.g., a cylindrical cavity and held in securely or tightly in place by metallic end screens or by a basket as discussed below.

Referring to the method of the invention in more detail, the activated catalyst of the invention is suitably made by depositing certain catalytic agents on certain catalytic bases as follows:

Applicable catalyst bases:

1) Zeolite molecular sieves of porous extrudate, pieces, pellets or spheres, herein "particles" of a diameter between 0.01 to 0.50 in. including ¼th in., ⅛th in. and ¹⁄₁₆th in. or more, in diameter or width, with a pore size of ½ to 300 Å or more and preferably between 3–100 Å.
2) Porous alumina, silica (including waterglass) or alumino-silicate extrudate, pieces, pellets or spheres, herein "particles", with size and pore size as listed in 1) above.

The above waterglass is an amorphous, high surface area, porous silica.

3) High surface area ceramic materials, e.g. ZMS, in low pressure-drop shapes (e.g. monolith, chunks, extrudate, pieces, pellets, spheres, herein "particles" or a combination thereof (but not powder) and of high porosity having a surface area of 100 to 1000 $m^2/g$, e.g. ⅛th in. diameter spheres having a surface area of 100 $m^2/g$.

To the above catalyst bases can be added certain catalytic agents per the invention, as noted above i.e.:

1) Cation species (in metal salts) of defined valence states therein, that form, e.g. oxides of Mn, Ag, Ru, Pb, V, Cr and Co or of other transition metals or noble metals, if desired, and 2) Base promotion of the above metal oxides. That is, catalytic (or ionic) promoters are chosen from Group I and Group II of the Periodic Table of the Elements. Examples are sodium ($Na^+$) potassium ($K^+$) and the ammonium ion ($N_4^{30}$) which is analogous to hydrogen for this purpose. Further examples are lithium ($Li_+$), strontium ($Sr^+$) and barium ($Ba^+$).

Thus to enhance the activity of the cation metals, which reduce or oxidize on calcination thereof, as discussed above, one can add ionic promoters, including base promoters as noted above, e.g., of $K^+$. For example, to a cation such as Mn, one can add K+ in solution and pour same over a catalyst base, of, e.g. ZMS spheres of ⅛ in. dia., to produce (per the above method of the invention) an activated catalyst. In the case of Ag as a catalyst metal, an ionic promoter may not be needed within the scope of the invention.

Per the invention, the amount of cation used per catalyst base is quantified with regard to the finished doped activated catalyst as follows. A desired loading of cation on catalyst base per the invention is 0.01 to 20.0 wt % of metals basis and preferably, 0.5 to 10.0 wt % thereof. For example, the above cation loading ranges include 1% w/w of Ag or of Mn/K. Thus where an ionic promoter is employed, it and the cation metal are combined in the wt % ranges given above. The above metal basis is employed though the above cation metals on calcination are converted to metal oxides.

The above cations are added to the catalyst base as a soluble salt as noted above. For examples, Mn is added as $KMnO_4$, Ag as $AgNO_3$, Ru as $RuCl_3$, Pb as $Pb(NO_3)_2$, V as $NH_4VO_3$, Cr as $(NH_4)_2Cr_2O_7$ and Co as $Co(NO_3)_2$.

The above are examples of cation salts employed in the present invention and various other soluble cation salts are included in the scope of the invention.

That is, the invention employs cations of certain defined valence states including the following:

$Ag^{+1}$, $Mn^{+4}$, $Mn^{+3}$, $Ru^{+4}$, $Pb^4$, $Pb^{+3}$, $Pb^{+2}$, $V^{+5}$, $Cr^{+4}$, $Cr^{+3}$, $Co^{+2}$ and $Co^+$ and all valence-corresponding salts thereof.

Upon calcination, in an oxidizing atmosphere, the above cations form oxides respectively, including:

$MnO_2$, $Ag_2O$, $RuO_2$, $PbO$, $V_2O_5$, $CrO_2$ and $CO_2O_3$.

Also per the invention, one can add a cation salt and a base promoter at the same time, e.g., $KMnO_4$, which upon calcination, in an oxidizing atmosphere, are oxidized to M®₂ and $K_2O$, respectively.

The following example is intended to illustrate a method embodying the present invention and should not be construed in limitation thereof.

EXAMPLE I

A sample of 1.823 grams of $KMnO_4$ was dissolved in 50 g. of distilled $H_2O$ at 25° C. Then 57.75 g. of 4 Å ZMS ¹⁄₁₆ in. pellets (extrudate) was added to such solution and soaked for one hour.

The so soaked catalytic agent and catalyst base (ZMS) were then dried overnight at 60° C. and then calcined in air at 350° C., again overnight. Obtained was a quantity of porous ZMS spheres of high porosity with the above catalyst agent of $MnO_2$ and base promoter of $K_2O$ doped into the interstices thereof, which spheres could be poured into a catalyst pack of desired shape.

The so activated catalyst spheres were poured into a basket 64 per FIG. 5 (discussed below) and tested by flowing 100 cc of 90 mole % $H_2O_2$ therethrough. A violent reaction was noted at temperatures of about 1200° F. with emissions of steam and $O_2$.

Thus the activated catalyst embodying the present invention is made of highly porous material doped with a desired catalytic agent per the invention, which facilitates the decomposition of $H_2O_2$. That is, $H_2O_2$ is flowed through, e.g., a catalyst pack of the invention, which pack being highly porous and of high surface area, permits the flow of $H_2O_2$ therethrough with low pressure drop and high catalytic contact therewith. Accordingly, the activated catalyst of the present invention, causes rapid decomposition of $H_2O_2$ according to the following reaction;

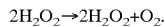

$$2H_2O_2 \rightarrow 2H_2O_2 + O_2.$$

e.g. 90 M % (steam)

Figure 2:
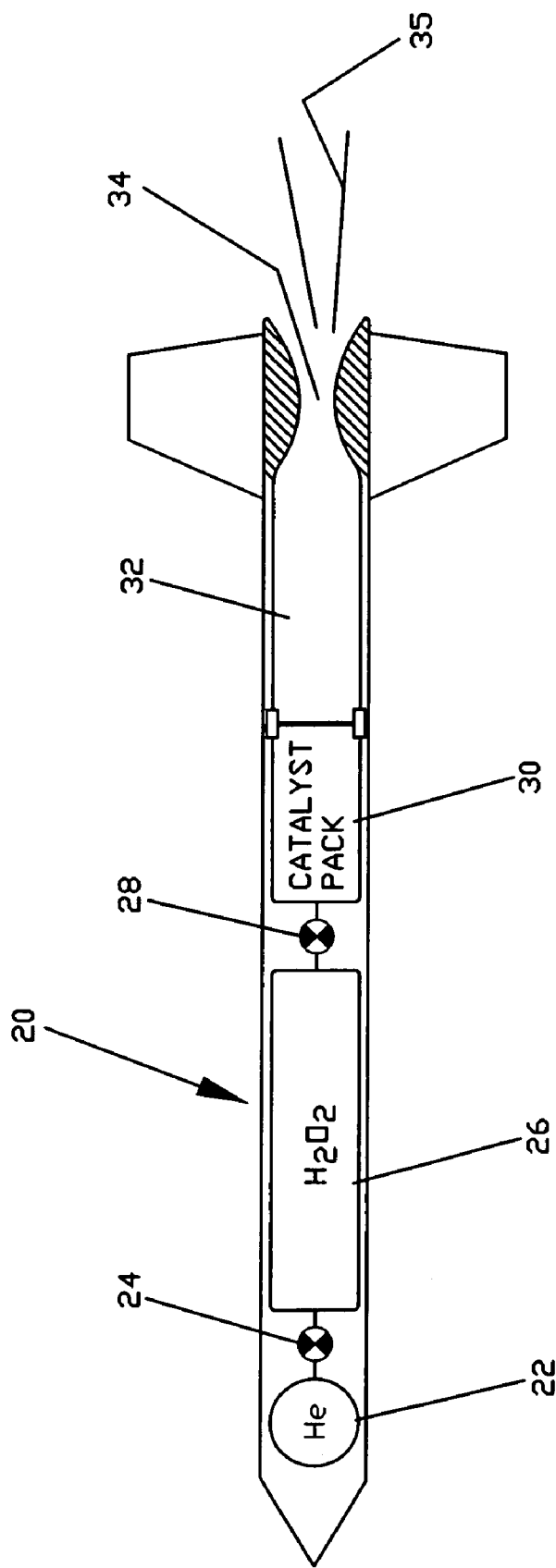
FIGS. 2, 3 and 4 are sectional elevation schematic views of rockets having propulsion systems which include catalyst packs embodying the present invention
Figure 3:
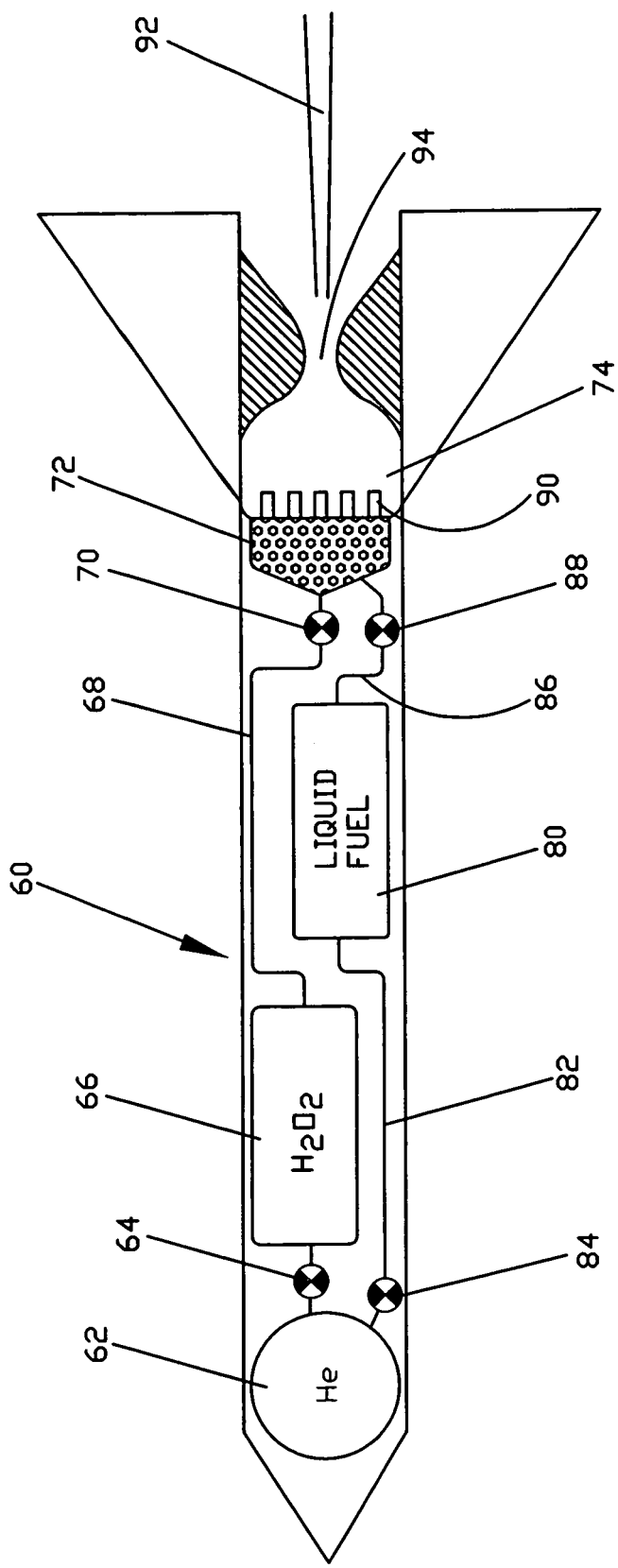
Figure 4:
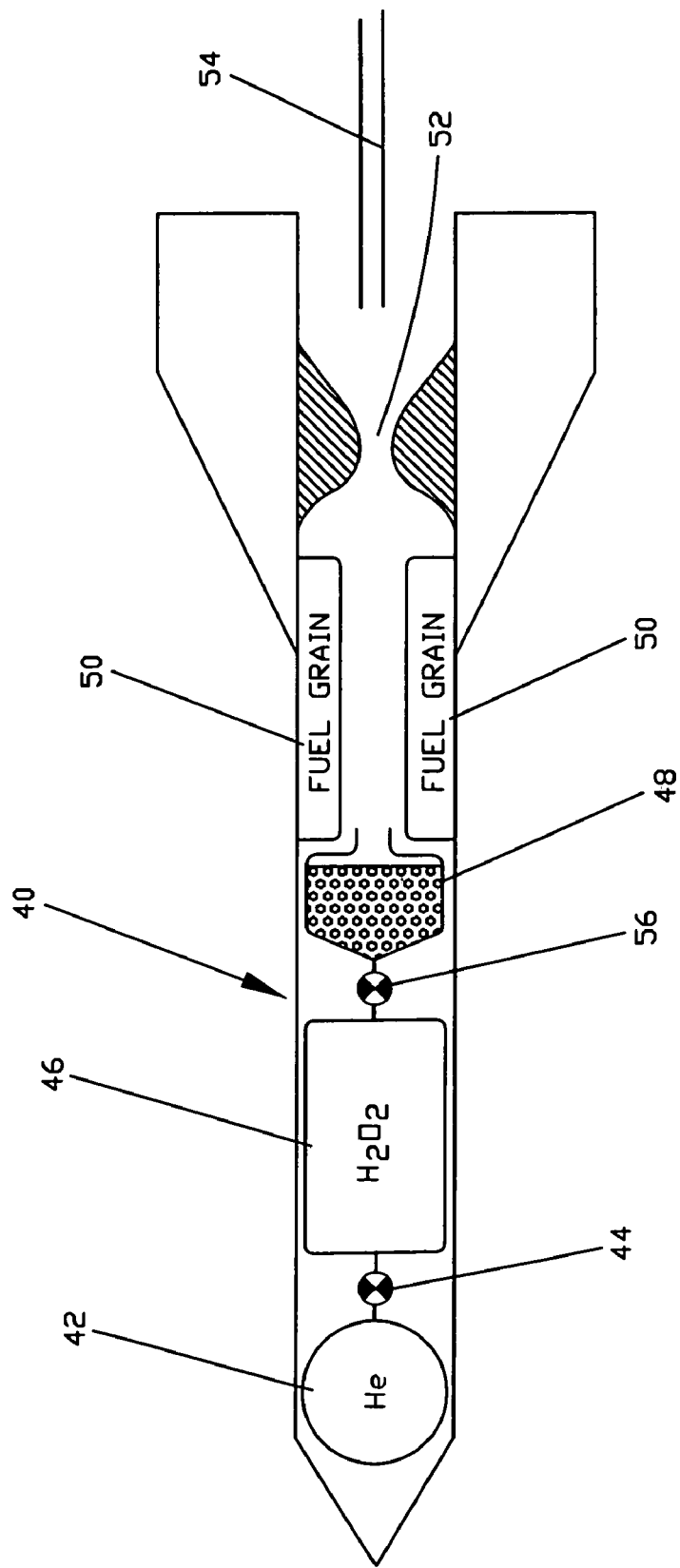

The catalyst pack embodying the invention can be employed in various systems including rocket propulsion systems as indicated in FIGS. 2, 3 and 4.

Thus as shown in FIG. 2, rocket 20 carries a pressurized tank of He 22, valve 24, pressurized tank 26 of $H_2O_2$, valve 28 and catalyst pack 30 in a monopropellant rocket system as shown.

In operation, opening valves 24 and 28, causes the helium to pressurize against the $H_2O_2$ and the latter to flow through valve 28 and through the catalyst pack 30, which causes a rapid decomposition of $H_2O_2$ and forms high temperature steam and oxygen, which flow into expansion chamber 32 and out of rear nozzle 34 in a jet stream 35, as shown in FIG. 2.

Thus in the example of FIG. 2, jet propulsion is obtained using the catalyst pack of the present invention without combustion of the reactants as indicated.

In a combustion example, a hybrid rocket 40, employing the catalyst pack of the invention, is shown in FIG. 4. Thus rocket 40 has pressurized helium tank 42, valve 44, pressurized $H_2O_2$ tank 46, catalyst pack 48 and fuel grain tube 50, as shown in FIG. 4.

In operation, valves 44 and 56 are opened and pressurized helium flows against pressurized $H_2O_2$ in tank 46, causing the latter to flow through catalyst pack 48 and decompose and flow down the interior of fuel grain tube 50, combusting with same (and eroding the interior thereof) forming a hybrid jet stream which flows through nozzle 52 and out of the rocket 40, to propel such rocket 40, as shown or indicated in FIG. 4. Advantageously, the jet of rocket 40 can be shut off by closing valve 56 and later restarted by opening such valve.

In the example of FIG. 3, rocket 60 has a tank 62 of pressurized helium, valve 64, a pressurized tank 66 of $H_2O_2$, flowline 68, valve 70 and catalyst pack 72 mounted adjacent combustion chamber 74, as shown. Rocket 60 also has a tank 80 of liquid fuel, which is connected, at its forward end, by line 82 and valve 84 to the tank 62 of helium and at its aft end, by fuel line 86 and valve 88 to fuel injectors 90, as shown in FIG. 3.

In operation, the respective valves 64 & 70 and 84 & 88 are opened causing the flow of $H_2O_2$ through the catalyst pack 72 and the flow of liquid rocket fuel through the fuel injectors 90, where fuel and decomposing $H_2O_2$ unite in powerful combustion, emitting a jet stream 92 out of the combustion chamber 74 through discharge nozzle 94, as shown in FIG. 3.

Thus various uses of the catalyst pack of the invention, in various shapes, in various rocket systems are indicated.

Figure 5:
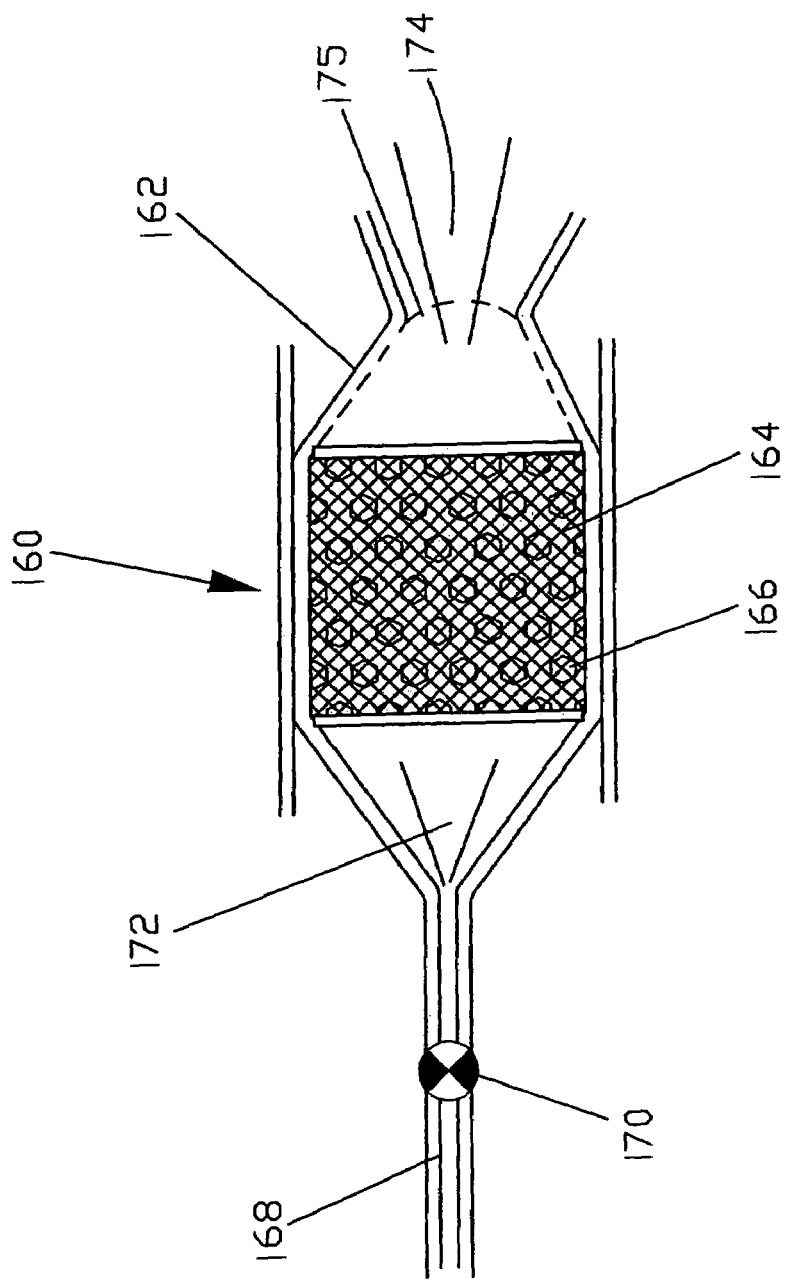
FIG. 5 is a fragmentary sectional elevation schematic view of another catalyst pack embodying the present invention.

Referring back to FIGS. 2–4, a more detailed catalyst pack is shown in FIG. 5. Thus catalyst pack 162, mounted in rocket housing 160, has basket 164, holding activated catalyst pellets 166 per the invention securely in place, as shown in FIG. 5. Inlet feed line 168 and valve 170, admit $H_2O_2$ to the catalyst pack 162 as inlet jet 172, which jet flows through and by the pellets 166, causing vigorous decomposition of $H_2O_2$ to steam and $O_2$. Such reaction results in, e.g. a 1000 to 1 increase in volume and a reaction temperature of, e.g. 1200° F., such that a high pressure jet 174 emits from discharge nozzle 175 to propel, e.g. the rockets of FIGS. 2–4, as indicated in FIGS. 2, 3, 4 and 5.

The catalyst pack of the invention can also be employed as a gas generator, e.g. as indicated in FIGS. 2–4 hereof when the rocket is held in place.

Thus the present invention provides a high surface area catalyst pack employing a porous ceramic, high surface area base impregnated or doped with an active cation catalytic agent which is highly effective in the decomposition of $H_2O_2$.

In sum, the activated catalyst of the invention includes
 a) a porous catalyst base doped with
 b) a catalytic agent that is a calcined cation and if desired,
 c) a catalytic promoter.

The activated catalyst of the invention has significantly higher activity and lower pressure drop than the metal screen packs of the prior art. The catalyst pack of the invention is both disposable and recyclable with relatively low costs of fabrication and cleaning respectively. That is, the catalyst pack of the invention has high surface area and activity, high poisoning threshold (blockage) and is of relative low cost and can be expendable or reusable. Another benefit of the catalyst pack of the invention is its low weight which is of high advantage in small flightweight rocket systems.

In sum, the catalyst pack of the invention is suitable for use
 1) with a liquid oxidizer injection system for a bipropellant rocket,
 2) with an oxidizer system in a hybrid rocket motor,
 3) by itself as a gas generator and
 4) by itself as a mono propellant thruster.

The activated catalyst of the invention is desirably of low pressure drop, stable at high temperatures and permits restartable combustion as noted above per FIG. 4.

Thus the activated catalyst embodying the invention has several uses including as a decomposition catalyst for hybrid rockets, liquid rockets, starter cartridges and as a gas or steam generator.

What is claimed is:

1. A method for decomposing $H_2O_2$ comprising, passing said $H_2O_2$ over an activated catalyst, said activated catalyst having a porous base, said porous base being doped with a calcined cation selected from the group consisting of Mn, Ag, Ru, Pb, V, Cr and Co, said base being a monolith.

2. The method of claim 1 wherein said base is also doped with at least one catalytic promoter, selected from $NH_4^+$ and Groups I and II of the Periodic Table.

3. The method of claim 2 wherein said promoter is selected from the group consisting of $K^+$, $Na^+$, $NH_4^+$, $Li^+$, $Sr^+$ and $Ba^{+\cdot}$ 4. The method of claim 1 wherein said activated catalyst is formed into a pack of a shape selected from the group consisting of cylindrical, conical, tubular and a combination thereof.

5. The method of claim 1 wherein said activated catalyst is contacted with said $H_2O_2$ in a vehicle having an exhaust nozzle for discharging the decomposition products of said $H_2O_2$ to propel said vehicle.

6. A method for decomposing $H_2O_2$ comprising,
a) mixing a soluble salt of a catalyst cation into solvent therefor to form a mixture of cations, the cation species being selected from the group consisting of Mn, Ag, Ru, Pb, V, Cr and Co,
b) contacting said mixture with a porous ceramic catalyst carrier in an amount sufficient to impregnate said catalyst carrier over the surfaces thereof,
c) drying the so impregnated carrier so as to remove solvent therefrom,
d) calcining said carrier so as to form a bulk or activated catalyst, said base defining a monolith, and
e) contacting said catalyst with $H_2O_2$ to decompose same.

7. The method of claim 6 wherein at least one catalytic promoter, selected from $NH_4^+$ and Groups I and II of the Periodic Table, is added to said solvent.

8. The method of claim 7 wherein said promoter is selected from the group consisting of $K^+$, $Na^+$, $NH_4^+$, $Li^+$, $Sr^+$ and $Ba^+$.

9. The method of claim 6 wherein said ceramic catalyst carrier is of a material selected from the group consisting of aluminosilicates, alumina, and silica.

10. The method of claim 6 wherein said cation is loaded on said catalyst carrier in a range of 0.01 to 20.0 wt. %, metals basis.

11. The method of claim 6 wherein said catalyst carrier is calcined at 150 to 950° C.

12. The method of claim 6 wherein said porous ceramic carrier is in the form of a honeycomb.

13. The method of claim 6 wherein the calcined carrier is contacted with said $H_2O_2$ in a vehicle having an exhaust nozzle for discharging the decomposition products of said $H_2O_2$ to propel said vehicle.

14. The method of claim 13 wherein said vehicle is a rocket.

15. The method of claim 13 wherein said vehicle is selected from the group consisting of a land vehicle, a water vehicle, an aircraft and a spacecraft.

16. The method of claim 13 wherein the decomposition products of said $H_2O_2$ are contacted with fuels selected from solid or liquid propellants in a rocket.

17. A method for decomposing $H_2O_2$ comprising contacting at least one cation with surfaces of a porous ceramic carrier or base and calcining same to form a bulk or activated catalyst as a monolith, the cation species being selected from the group consisting of Mn, Ag, Ru, Pb, V, Cr and Co and contacting said catalyst with $H_2O_2$ to decompose same.

18. The method of claim 17 wherein said carrier has added thereon at least one catalytic promoter, selected from $NH_4^+$ and Groups I and II of the Periodic Table.

19. The method of claim 18 wherein said promoter is selected from the group consisting of $K^+$, $Na^+$, $NH_4^+$, $Li^+$, $Sr^+$ and $Ba^+$.

20. The method of claim 19 wherein the cation loading on the catalyst carrier is 0.01 to 20.0 wt. % of the bulk catalyst.

* * * * *